Patented Dec. 17, 1935

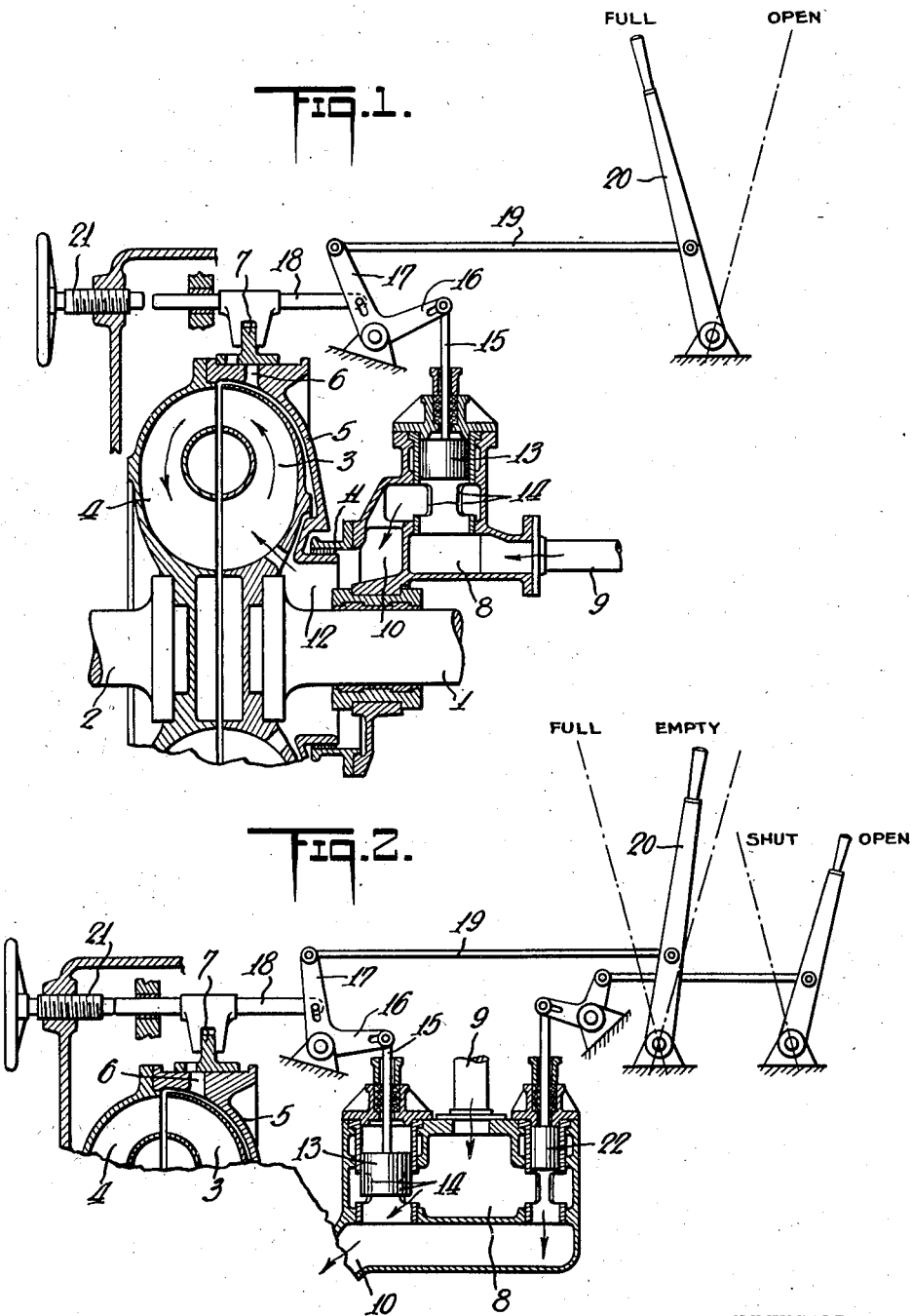

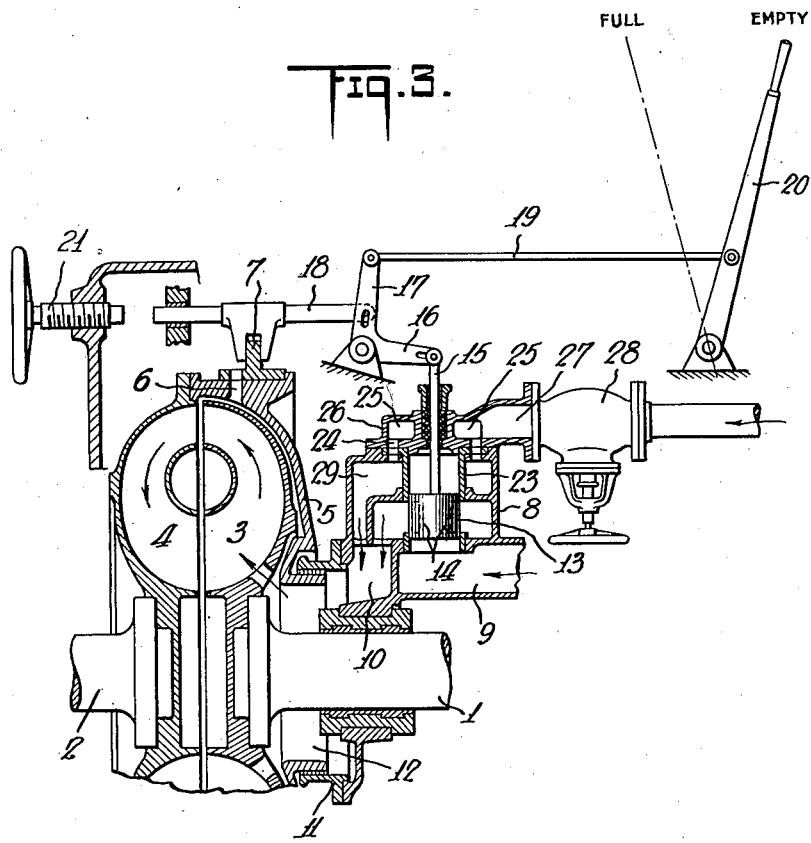

2,024,842

UNITED STATES PATENT OFFICE 2,024,842

DEVICE FOR CONTROLLING LIQUID COUPLINGS

Gustav Bauer, Hamburg, and Walter Brose, Bremen, Germany

Application February 15, 1934, Serial No. 711,360
In Germany February 16, 1933

8 Claims. (Cl. 60—54)

It is known that internal combustion engines cannot be throttled down to very low speeds even if large flywheels be used. In general they can hardly be throttled down to below about a quarter of the normal speed, without fear of misfiring or irregular rotation of the engine shaft. It is therefore impossible to bring shafts driven by internal combustion engines to a low speed, desired or necessary in many cases, below the lowest speed of the engine. Among other cases this fault is particularly noticeable in motor ships.

According to the invention this fault is overcome by connecting the engine to the driven shaft by a hydraulic coupling of which the slip can be adjusted as desired from full down to very low power transmission. In this way with any desired constant speed of the engine, a low propeller speed for example can be obtained.

This is carried out in practice by the coupling being filled not completely but only partially during operation at the lowest speed of the secondary wheel or propeller shaft. In this case slip of any desired extent, depending on the degree to which the coupling is filled, takes place between the primary and secondary wheels of the coupling. For a given primary speed of the coupling, that is at a constant speed of the driving engine, a lower speed of the secondary wheel or in other words any desired speed difference or reduction ratio between the primary wheel and secondary wheel is obtained by adjustment of the filling or slip. Completely filled, however, the coupling will in known manner transmit power at approximately the speed of the engine.

The invention further extends to devices by which the degree of filling of the coupling can be regulated to adjust the variable slip to the desired value, either in direct or indirect cooperation with the usual filling and emptying devices of the coupling.

Three examples embodying the invention are illustrated in Figures 1, 2, and 3 respectively of the accompanying drawings, the filling and emptying devices and part of the coupling being shown in longitudinal section in all figures.

Like parts are designated by the same reference numerals in the several figures wherein 1 indicates the driving shaft, 2 the driven shaft, 3 the primary wheel and 4 the secondary wheel of the hydraulic coupling. The latter is fast to the coupling casing 5. Emptying ports 6 are provided in the latter which can be closed and opened by a rotatable ring 7 provided with corresponding ports. Filling of the coupling is effected by means of an interposed liquid chamber 8 connected by a pipe 9 with a pump. The chamber is connected by a duct 10 with a stuffing box 11 which seals the inlet 12 of the coupling. The duct 10 is controlled by a piston valve 13 which opens the ports 14 leading from the chamber to the duct when the coupling is being filled and closes them when it is emptied.

The valve 13 and emptying ring 7 are so coupled by a linkage 15, 16, 17, 18 that the valve normally leaves the ports 14 fully open when the emptying ring normally closes the ports 6. The linkage is coupled by a rod 19 to a control lever 20 by which the valve 13 and the emptying ring 7 can be set by a single handle for complete filling or complete emptying, as desired.

In the embodiment shown in Figure 1 an auxiliary device is provided by which the intermediate adjustments of the filling and emptying devices are effected with both the filling members 13, 14 and the emptying members 6, 7 being partly opened. Such an auxiliary device can be for example a threaded spindle 21 which limits the stroke of the controlling linkage according to need. In the illustrated example the end of the spindle 21 coacts with the outer end of the linkage element 18. With normal filling and emptying procedure the element 18 is clear of the spindle (Figure 1). If only partial filling of the coupling is required, the spindle 21 is so set that it decreases the stroke of the element 18 so that in one end position the filling and emptying devices remain partly open as in Figure 2. In this case the coupling is partly emptied. At the same time the partial opening of the members 13, 14 prevents complete emptying of the coupling.

By means of a separately controllable auxiliary inlet valve 22 also communicating with the inlet duct 10 the exact degree of filling of the coupling can be accurately controlled in combination with the partial opening of the main inlet valve 13.

The discharge valve 7 and the supply valve 13 are interconnected for simultaneous operation but the valve 22 which is in parallel with the valve 13 may be independently opened. With the valve 7 opened to any given extent the normal amount of inflow will be determined by the corresponding position of the valve 13, but this normal inflow may be made greater or less as desired by adjusting the position of the valve 22. The valves may be so set that a small amount of liquid may flow through the coupling and serve to cool the parts and remove the heat of friction of circulating air when the coupling is substantially empty and no further power is being transmitted.

Such or a similar auxiliary member can however be used alone to adjust the variable slip of the coupling if the filling members 13, 14 and emptying members 6, 7 are fully closed and opened respectively in normal manner. Another embodiment acting in this way is shown in Figure 3. Here ports 24 are provided in the flange of the sleeve 23 for the piston valve 13, and an annular duct 25 in the cover 26 of the filling member. The liquid passing through ports 24 reaches the duct 10 leading to the coupling through a by-pass 29. With the duct 25 communicates a supply pipe 27 in which a simple stop valve 28 is provided for regulating the desired rate of flow of liquid. With the filling device 13, 14 closed and the emptying device 6, 7 fully open, the degree of filling of the coupling is adjusted solely by means of the valve 28.

What we claim is:

1. A liquid coupling adapted for connecting a driving shaft and a driven shaft, and provided with an inlet control member, an outlet control member, coupling connections between said members whereby either may be opened or closed and the opening movement of one is accompanied by closing movement of the other, and an adjustable member for limiting the movement of said members.

2. A liquid coupling adapted for connecting a driving shaft and a driven shaft, and provided with an inlet control member, an outlet control member, coupling connections between said members whereby either may be opened or closed and the opening movement of one is accompanied by closing movement of the other, and an adjustable stop for limiting the movement of one of said members.

3. A liquid coupling adapted for connecting a driving shaft and a driven shaft, and provided with an inlet control member, an outlet control member, coupling connections between said members whereby either may be opened or closed and the opening movement of one is accompanied by closing movement of the other, and an auxiliary control member in parallel with one of said first mentioned members for varying the rate of flow through the coupling when both of said first mentioned control members are partially open.

4. A liquid coupling for connecting a driving shaft and a driven shaft, and provided with an outlet control valve and a pair of inlet control valves arranged in parallel, coupling means for connecting said outlet valve and one of said inlet valves for simultaneous operation, and independent means for operating the other inlet control valve.

5. A liquid coupling having an inlet, a control member therefor, an outlet, a control member therefor, an operating member for simultaneously opening one of said control members and closing the other, and an adjustable stop for limiting the extent of closing movement of said outlet control member.

6. A liquid coupling having an inlet, a control member therefor, an outlet, a control member therefor, an operating member for simultaneously opening one of said control members and closing the other, and holding them in any desired intermediate position, an adjustable stop for limiting the extent of closing movement of said outlet control member, and an independently operable control member in parallelism with one of said first mentioned control members.

7. A liquid coupling having an inlet, a control member therefor, an outlet, a control member therefor, an operating member for simultaneously opening one of said control members and closing the other, a by-pass around said inlet control member, and means for controlling said by-pass.

8. A liquid coupling having an inlet, a control member therefor, an outlet, a control member therefor, an operating member for simultaneously opening one of said control members and closing the other, an adjustable stop for limiting the movement of said operating member, a by-pass around said inlet control member, and means for controlling said by-pass.

GUSTAV BAUER.
WALTER BROSE.